United States Patent
Wang

(10) Patent No.: US 6,966,570 B2
(45) Date of Patent: Nov. 22, 2005

(54) BIKE HANDLE SECURING DEVICE FOR A COLLAPSIBLE BIKE FRAME

(76) Inventor: Ping-Tien Wang, 15/F., No. 135, Ching Tung Street, East District, Tainan (TW)

( * ) Notice: Subject to any disclaimer, the term of this patent is extended or adjusted under 35 U.S.C. 154(b) by 884 days.

(21) Appl. No.: 09/836,415

(22) Filed: Apr. 18, 2001

(65) Prior Publication Data

US 2002/0153695 A1 Oct. 24, 2002

(51) Int. Cl.[7] .............................................. B62K 15/00
(52) U.S. Cl. ...................... 280/278; 280/280
(58) Field of Search ............................... 280/278, 287, 280/279, 280

(56) References Cited

U.S. PATENT DOCUMENTS

| | | | | |
|---|---|---|---|---|
| 3,831,979 A | * | 8/1974 | Baginski | 280/279 |
| 5,337,609 A | * | 8/1994 | Hsu | 74/551.3 |
| 5,419,573 A | * | 5/1995 | Kao | 280/278 |
| 5,492,350 A | * | 2/1996 | Pan | 280/278 |
| 5,947,500 A | * | 9/1999 | McGrane | 280/287 |

* cited by examiner

*Primary Examiner*—Kevin Hurley
(74) *Attorney, Agent, or Firm*—Bacon & Thomas

(57) ABSTRACT

A bike handle tightening device after separated from a bike frame includes a fix tube fixed on a bike frame and having a hollow interior, a vertical rod of a handle, a threaded rod inserting in the vertical rod from top and having a lower end protruding out of the vertical rod, and a tightening member screwing with the threaded rod and having a sloped end surface. The vertical rod and the tightening member are inserted in the fix tube, and the threaded rod is rotated to force the tightening member to move nearer to and contact and rotate along a sloped bottom end surface of the vertical rod so as to let the axis of the vertical rod and the tightening member move away from each other so that the vertical rod and the tightening member push against opposite portions of an inner wall of the fix tube to tighten the handle therein, reducing the size of the bike collapsed for convenience of transporting and storing and helping stabilize the bike after collapsed.

4 Claims, 7 Drawing Sheets

BIKE HANDLE SECURING DEVICE FOR A COLLAPSIBLE BIKE FRAME

BACKGROUND OF THE INVENTION

This invention relates to a device for securing a bike handle to a bike frame after the handle is separated from the bike frame, and particularly to a device which reduces packaging material for storing, positioning, and transporting a collapsible bike.

Bike manufacturers generally try to reduce transporting costs by increasing the number of bikes transported in a container by packaging the bike frames disassembled from the handles while combined with the brake lines and speed changing lines to reduce the size of package boxes. The consumers thereafter assemble the handle with the brake lines and the speed changing lines with the bike frame. This kind of packaging bikes is more popular for collapsible bikes, which are collapsed by bending a front frame on a rear frame or vice versa to reduce the size of bikes to be packaged for transporting so that manufacturers may reduce the cost for package material and consumers may easily store their bikes. However, even after a handle is separated from a bike frame and later combined with the frame for packing, there arises a problem that the handle with the vertical tube of a front fork tube may still require a large space. It is known to design a handle to be bendable to solve this problem, but this structure has the following disadvantages:

1. As for transporting, although the handle may be positioned flat on one side of the bike frame, the handle may collide with the frame and result in damage to the bike.

2. As for assembling, the frame and the handle are separated from each other, but are connected with some brake lines and speed changing lines, so consumers may forget to take out the frame together with the handle, and the handle may be fall down on the ground or be pulled along the lines to become damaged.

3. As for collapsible bikes, the handle requires a bendable joint or a component for positioning in order to make the handle bendable and reduce the package size.

4. As for the collapsed condition, there is no stabilizing means for the collapsed front frame and the collapsed rear frame in a package box, so the front fame and the rear frame may expand easily with the pivot joint as fulcrum, especially during transport by a user.

SUMMARY OF THE INVENTION

This invention comprises a device for securing a bike handle after the handle is separated from a collapsible bike frame, in order to reduce its size for packaging, transporting and storing to help stabilize the collapsed bike.

The bike handle securing device includes a sidewise hollow fix tube, a hollow vertical rod of a handle which is sloped at its bottom end, a threaded rod inserted in the vertical rod from its top and with its bottom end extending out of the vertical rod, and a tightening member having a sloped upper surface to contact the sloped bottom end surface of the vertical rod and secured together with the threaded rod. The vertical rod and the tightening member are inserted in the fix tube, and the threaded rod is rotated to move the tightening member and the vertical rod, forcing the axis of the tightening member and that of the vertical rod out of alignment to permit the outer surfaces of the tightening member and the vertical rod to tightly engage the inner wall of the fix tube, thereby securing the handle on the bike frame.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
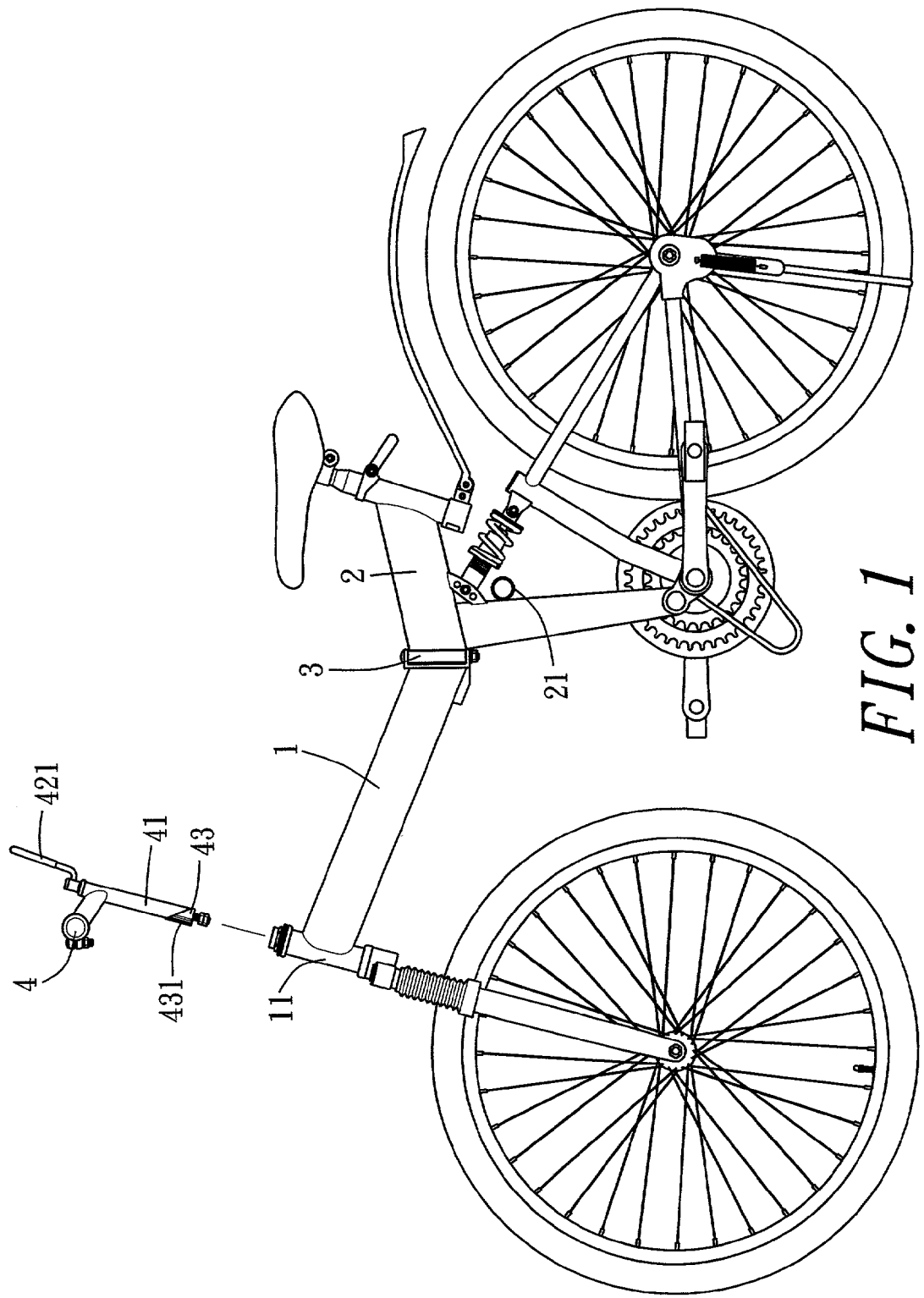
FIG. 1 is an exploded perspective view of a handle separated from a bike frame in the present invention.

A bike handle securing device for a bike frame in the present invention, as shown in FIG. 1, includes a vertical rod 41 of a handle 4 combined with a front fork tube of a front frame 1 of a bike, and a fix tube 21 fixed on a rear frame 2 of the bike.

Figure 2:
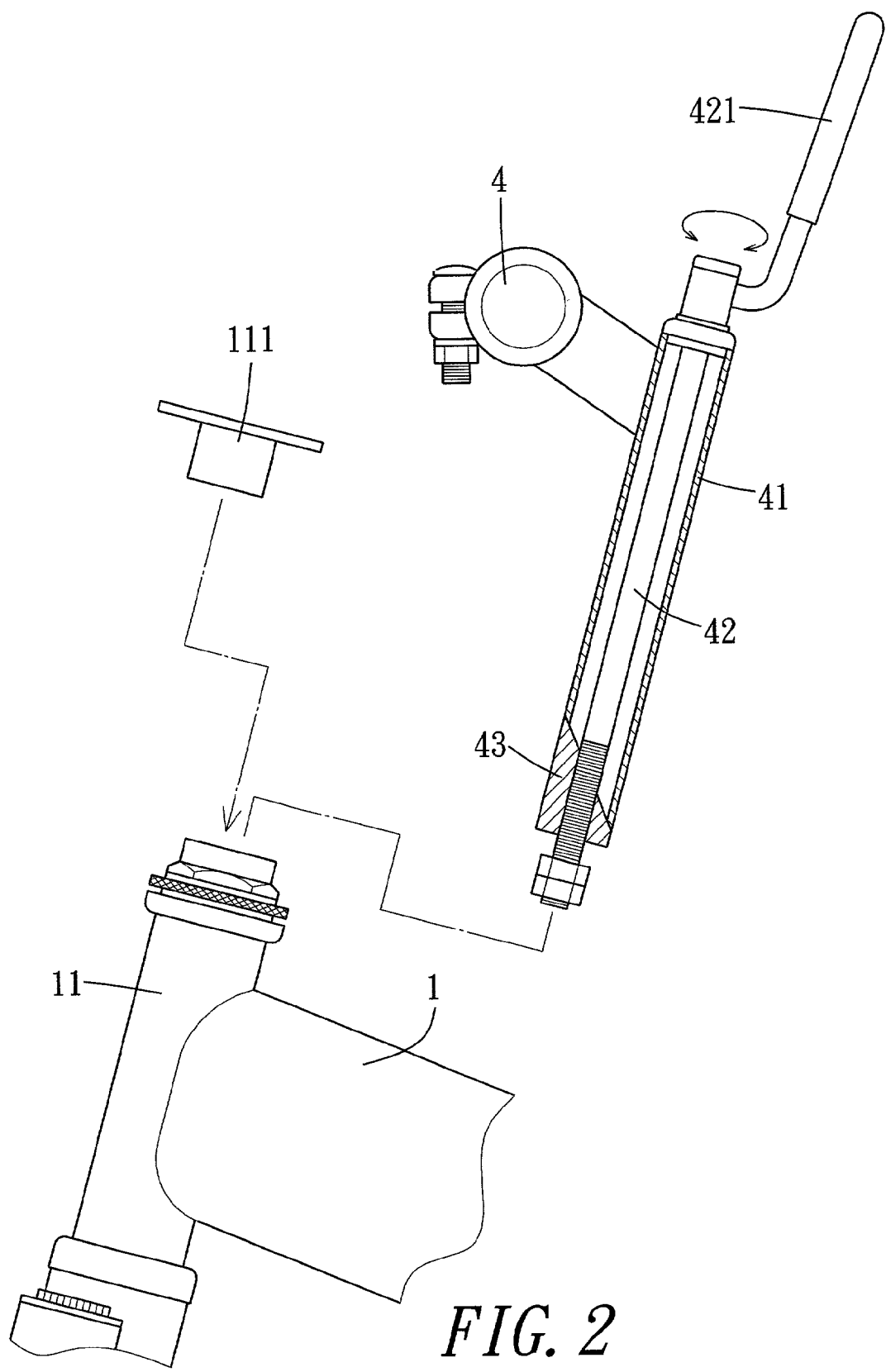
FIG. 2 is a partial magnified view of FIG. 1.
Figure 3:
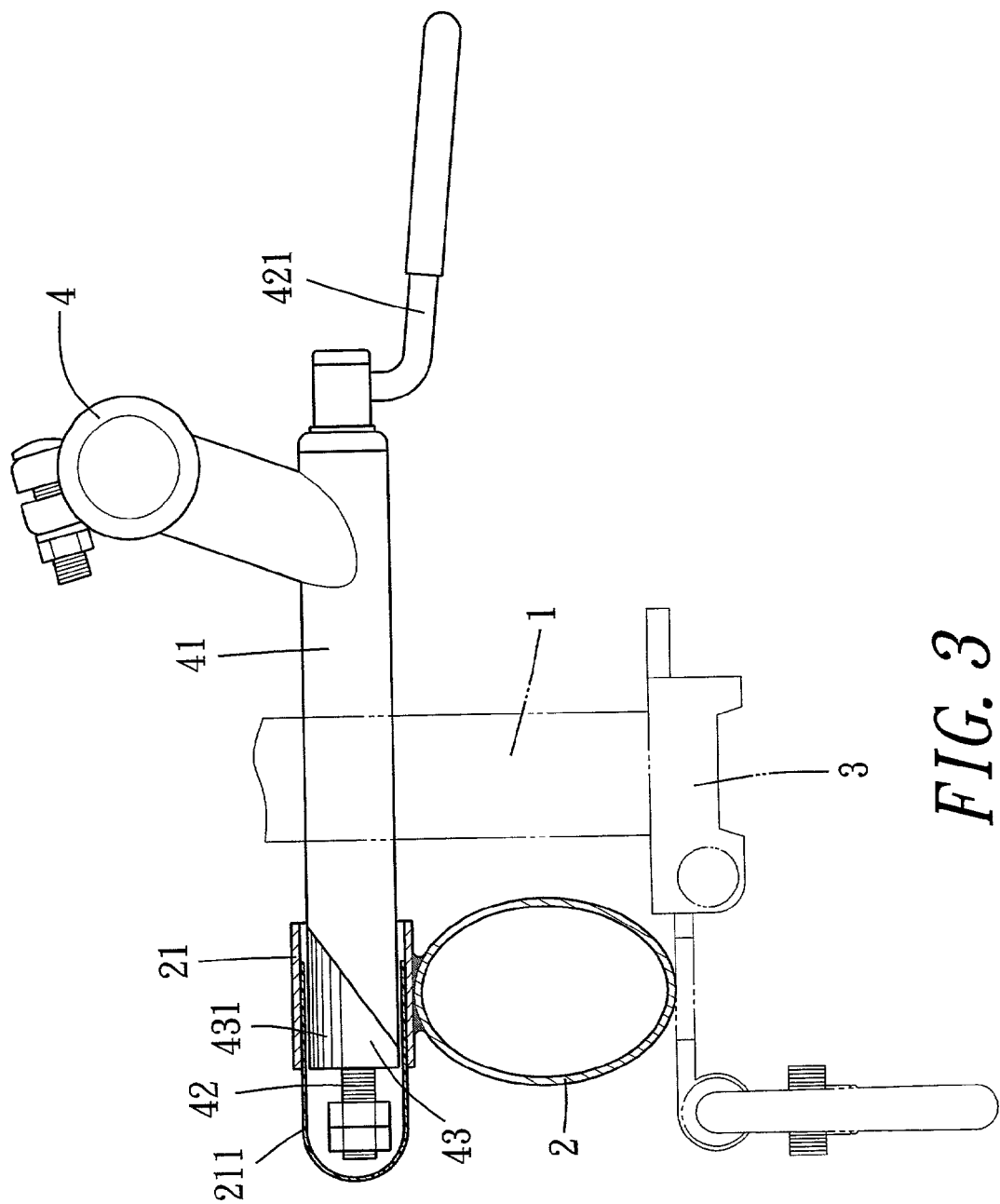
FIG. 3 is a cross-sectional view of the handle securing device in the present invention.

The vertical rod 41 of the handle 4 is hollow, having a sloped bottom end surface, and a threaded rod 42 inserted through the vertical rod 41 from its top, as shown in FIG. 2. The threaded rod 42 has an upper end pivotally connected to an L-shaped operating rod 421, and a bottom end protruding out of the bottom of the vertical rod 41, and a column-shaped tightening member 43 having an upper sloped surface to contact the sloped bottom end surface of the vertical rod 41, a center threaded hole to screw with the threaded rod 42, and plural lengthwise straight ribs 431 formed on a longer side wall for increasing friction, as shown in FIG. 3.

Figure 4:
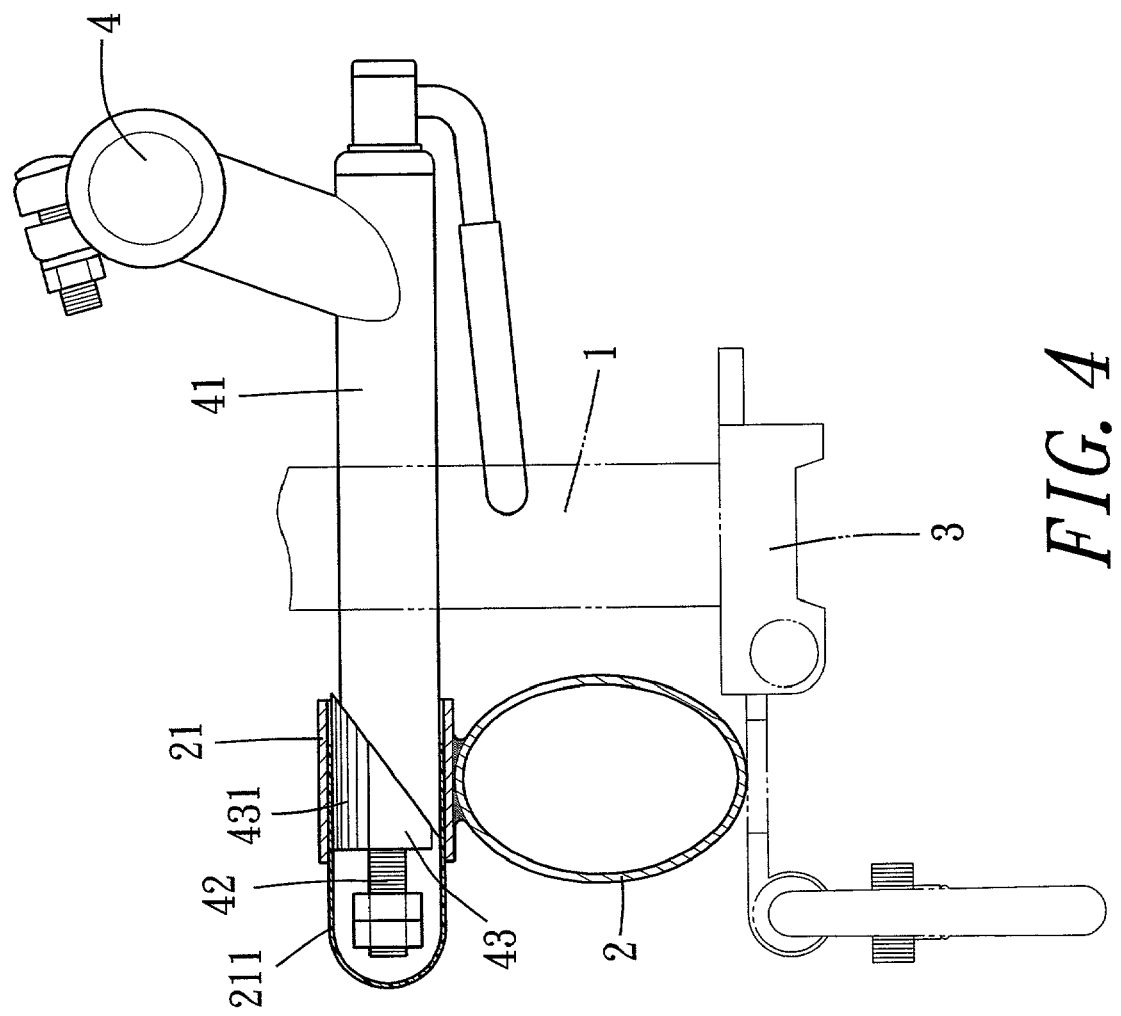
FIG. 4 is a cross-sectional view of the handle securing device in the present invention, showing a different degree of tightening the handle.

The fix tube 21 is secured in position on a rear frame of a bike, and having an inner diameter that is slightly larger than the diameter of the vertical rod 41, and an optional protective cover 211 for closing the outer end of the fix tube 21, as shown in FIG. 4.

Figure 5:
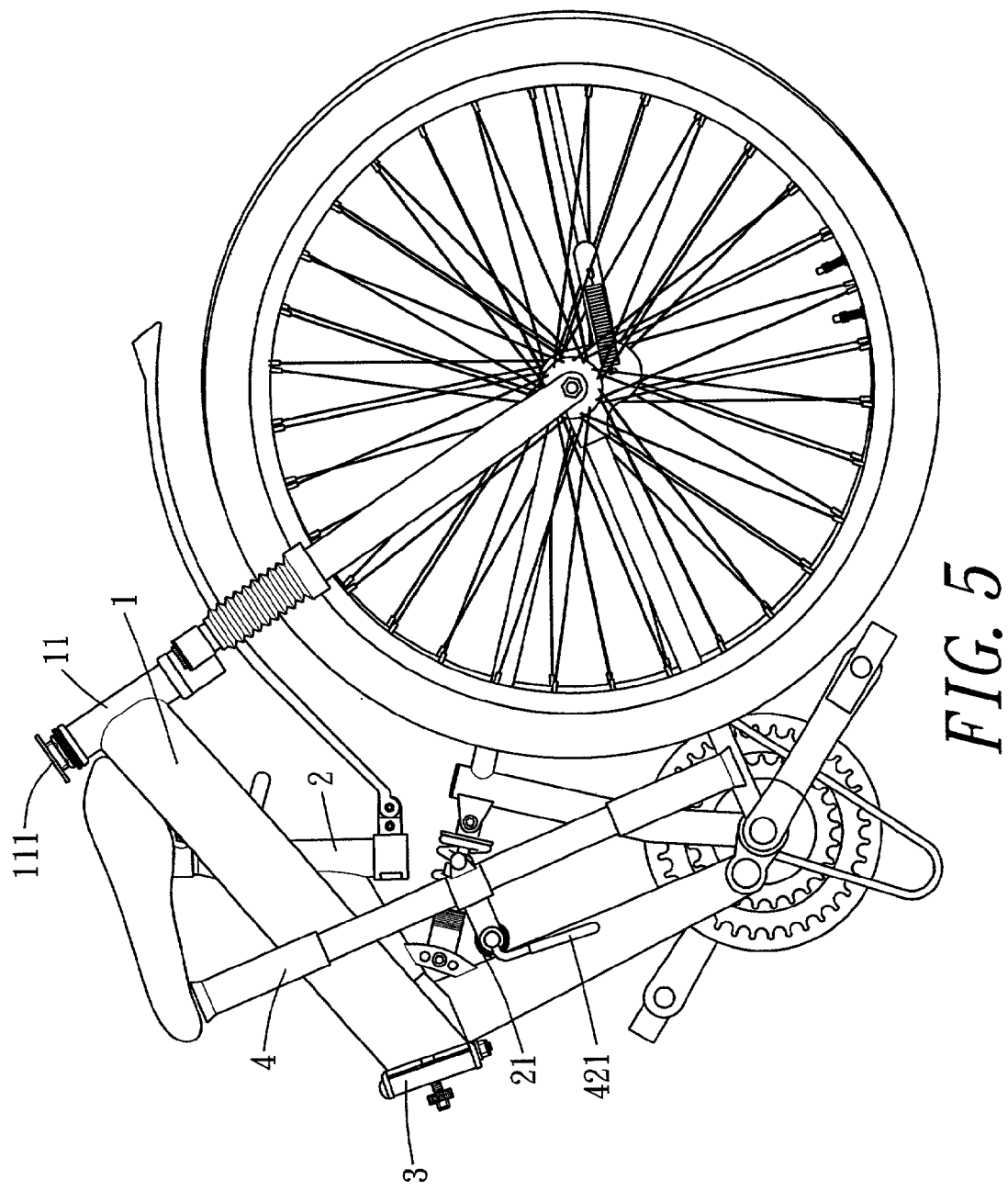
FIG. 5 is a perspective view of the handle securing device securing the handle on a collapsed bike frame in the present invention.

In assembling, the bike handle securing device may have two kinds of assembled conditions, one for collapsing and the other for riding. First, if it is assembled for collapsing, referring to FIGS. 3, 4 and 5, a collapsing joint 3 connecting the front frame 1 and the rear frame 2 is loosened to pivotally bend the front frame 1 and the rear frame 2 to each other, and then the vertical rod 41 together with the tightening member 43 is inserted in the fix tube 21 of the rear frame 2, as shown in FIG. 3. The operating rod 421 is the rotated and subsequently the threaded rod 42 together, forcing the tightening member 43 to move along the threaded rod 42 to the vertical rod 41, with the upper surface of the tightening member 43 rotating along the bottom end surface of the vertical rod 41 so that the tightening member may bias out of the same axis as that of the vertical rod 41, with the lengthwise straight ribs 431 of the tightening member 43 tightly engaging the inner wall of the fix tube 21 while the outer wall of the vertical rod 41 contrary to the straight ribs 431 pushes against the inner wall of the fix tube 21 to secure the handle 4 in the outer side of the fix tube 21, preventing debris from entering the fix tube 21. Thus the handle 4 is secured together with the collapsed bike frame as shown in FIG. 5. In addition, the upper end of the front fork tube 11 is open after the handle 4 is secured in the fix tube 21, so an upper cap 111 may be provided to close up the upper end of the front fork 11, as shown in FIGS. 2 and 5.

As can be seen from FIG. 5, the vertical rod 41 is stabilized with the rear frame 2 when the handle 4 is secured in the fix tube 21, and the vertical rod 41 also pushes against the front frame 1, keeping the front frame 1 and the rear frame 2 in a stable position and preventing them from expanding, thus rendering the bike convenient to carry.

Figure 6:
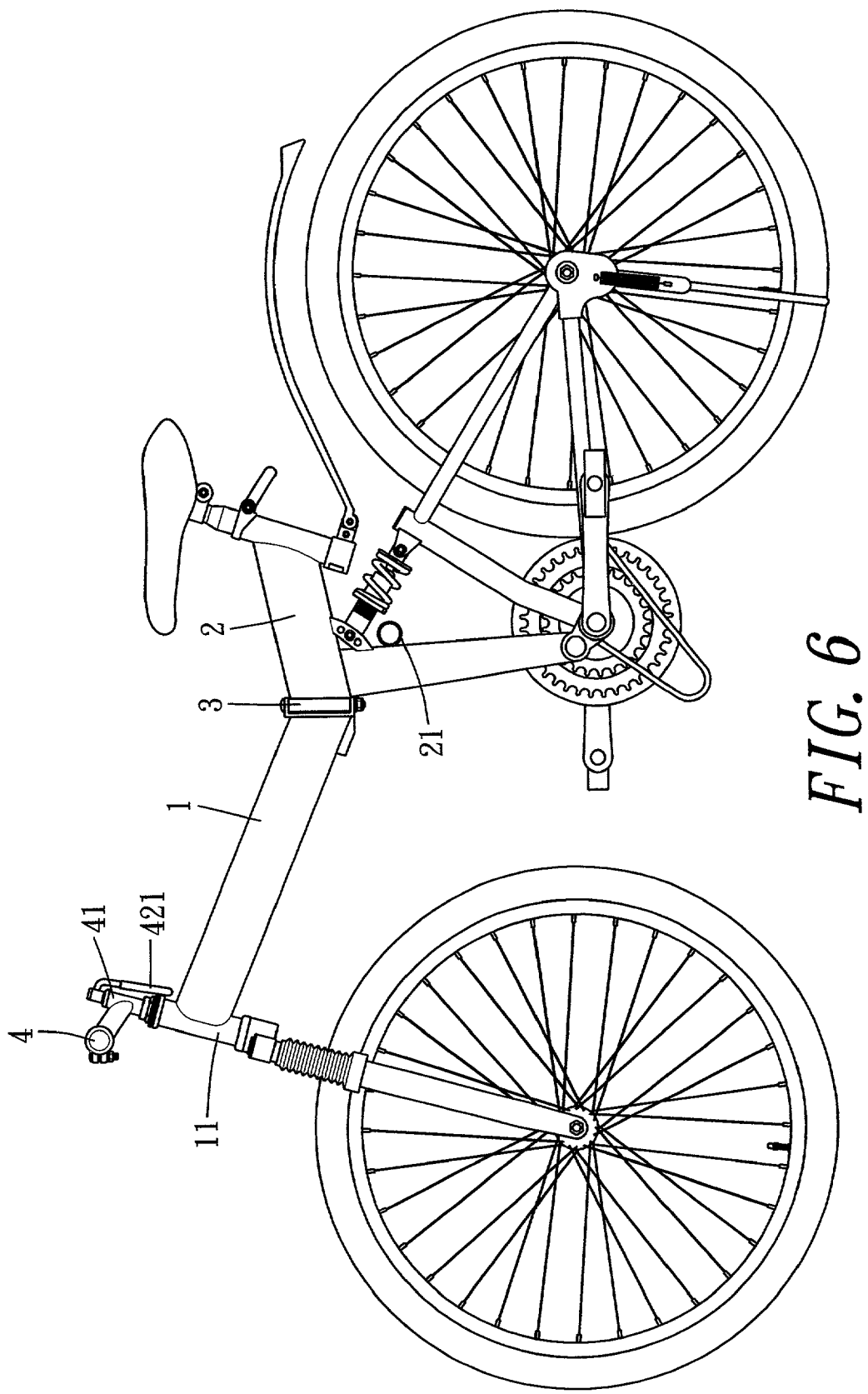
FIG. 6 is a side view of the handle secured with the front fork of the bike frame in the present invention; and, FIG. 7 is a partial enlarged cross-sectional view of FIG. 6.
Figure 7:
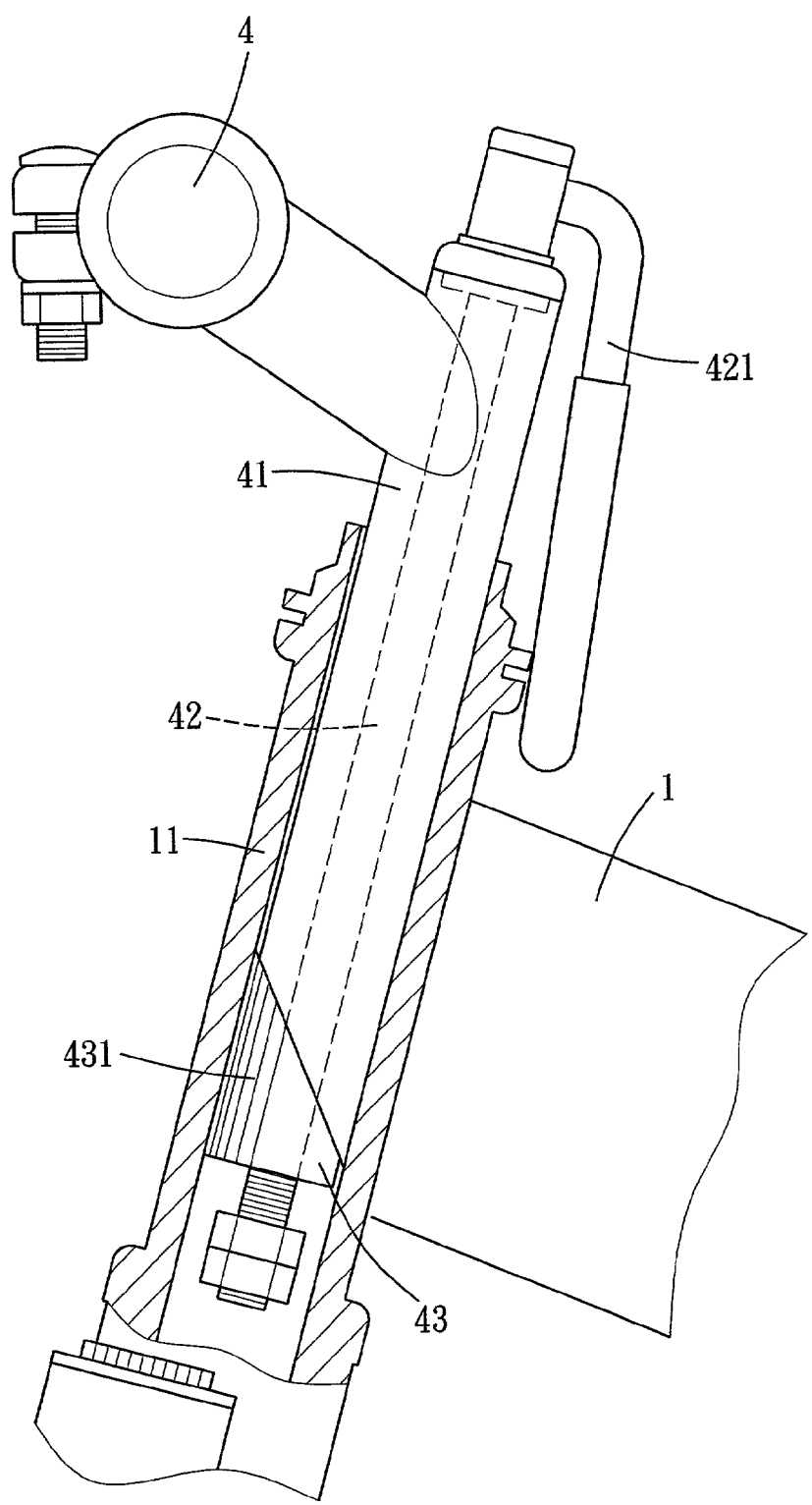

Next, as shown in FIGS. 6 and 7, if a user wants to ride the bike, first separate the handle 4 from the fix tube 21, evolve the front frame 1 and the rear frame 2 with the collapsing joint 3 as a fulcrum and stabilize the joint 3, insert the vertical rod 41 of the handle 4 in the front fork tube 11, with the upper cap 111 removed. Then rotate the operating rod 421 together with the threaded rod 42, forcing the vertical rod 41 and the tightening member 43 to push against the inner wall of the front fork tube 11 tightly, as shown in FIG. 7. Lastly the operating rod 421 is pressed down to contact the front fork tube 11, as shown in FIG. 6, forming the bike in a position to ride. To collapse the bike after riding, fold the front frame 1 and the rear frame 2 to each other according to the process described above, and separate the handle 4 from the front fork tube 11 and rotate and insert the handle 4 in the fix tube 21 in the collapsed position shown in FIGS. 4 and 5.

The bike handle securing device has several advantages.

1. In packaging and transporting, the handle 4 is secured on the rear frame, not assembled with the front fork tube 11, thus effectively reducing the side of the package box, and preventing damage to the bike frame during transporting.

2. When a consumer buys a bike packaged and opens the package box to take out the bike, there is no danger of the handle 4 and the brake lines or the speed changing lines falling onto the ground.

3. The handle is directly taken off to reduce the size of the package, thus eliminating the joint for bending the handle in a conventional collapsible bike, reducing the cost for packaging and transporting and simplifying the whole structure.

4. The handle 4 also stabilizes the front frame 1 when the handle 4 is tightened on the rear frame 2, as shown in FIG. 5, so the front frame 1 and the rear frame 2 cannot extend with the collapsing joint 3 during transporting or carrying.

5. The lengthwise straight ribs 431 on the outer wall of the longer side of the tightening member 43 significantly increase friction between the front fork tube 11 and the fix tube 21, thus ensuring that handle 4 will not fall off during transportaion.

I claim:

1. A device for securing a handle of a bike having collapsible front and rear frame sections after the frame sections are collapsed together and the handle is removed from a front fork tube of the bike, the device comprising:

(a) the handle including a hollow vertical rod terminating in a bottom end having a sloped bottom end surface;

(b) a threaded rod disposed within the vertical rod and having a bottom end protruding from the sloped bottom end surface of the vertical rod;

(c) a column-shaped tightening member having a center threaded hole in threaded engagement with the threaded rod and a sloped upper surface for engaging the sloped bottom end surface of the threaded rod upon rotation of the threaded rod, whereby the longitudinal axes of the vertical rod and tightening member being in coaxial alignment prior to rotation of the threaded rod; and (d) a fixed tube mounted to the rear frame section of the bike, the fixed tube having a hollow interior of sufficient diameter for receiving the tightening member and the bottom end of the vertical rod such that upon rotation of the threaded rod, the sloped bottom end surface of the vertical rod is forceably engaged by the sloped upper surface of the tightening member to move the longitudinal axes of the vertical rod and tightening member out of coaxial alignment and causing the tightening member and bottom end of the vertical rod to engage the interior of the fixed tube for securing the handle to the rear frame section.

2. The bike handle securing device of claim 1, wherein the threaded rod includes an upper end and an operating rod pivotally connected to the upper end for rotating the threaded rod.

3. The bike handle securing device of claim 1, wherein the tightening member includes a plurality of straight ribs formed on a longer sidewall thereof for increasing friction during engagement of the sidewall against the interior wall of the fixed tube.

4. The bike securing device of claim 1, wherein the fixed tube includes an outer end and further including a protective cover for closing the outer end to prevent debris from entering the fixed tube.

\* \* \* \* \*